Aug. 1, 1967  G. SIEBOL ET AL  3,333,454
STRIPPER MECHANISM
Filed Dec. 23, 1964  2 Sheets-Sheet 1
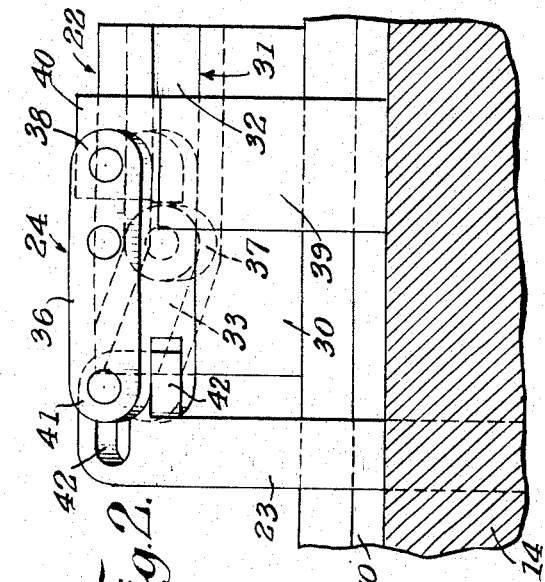
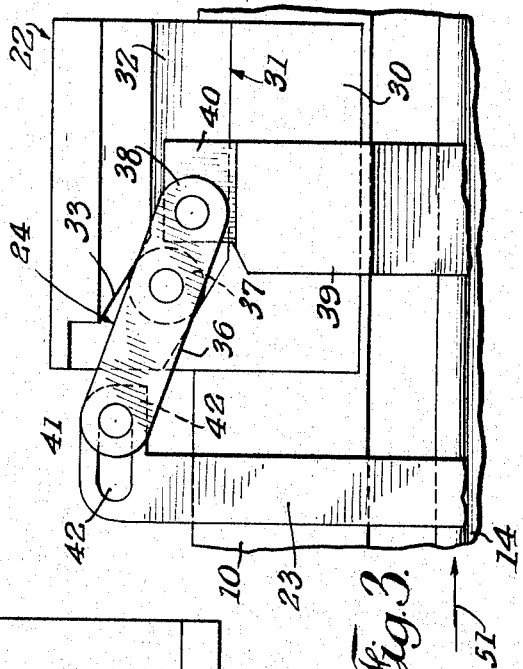
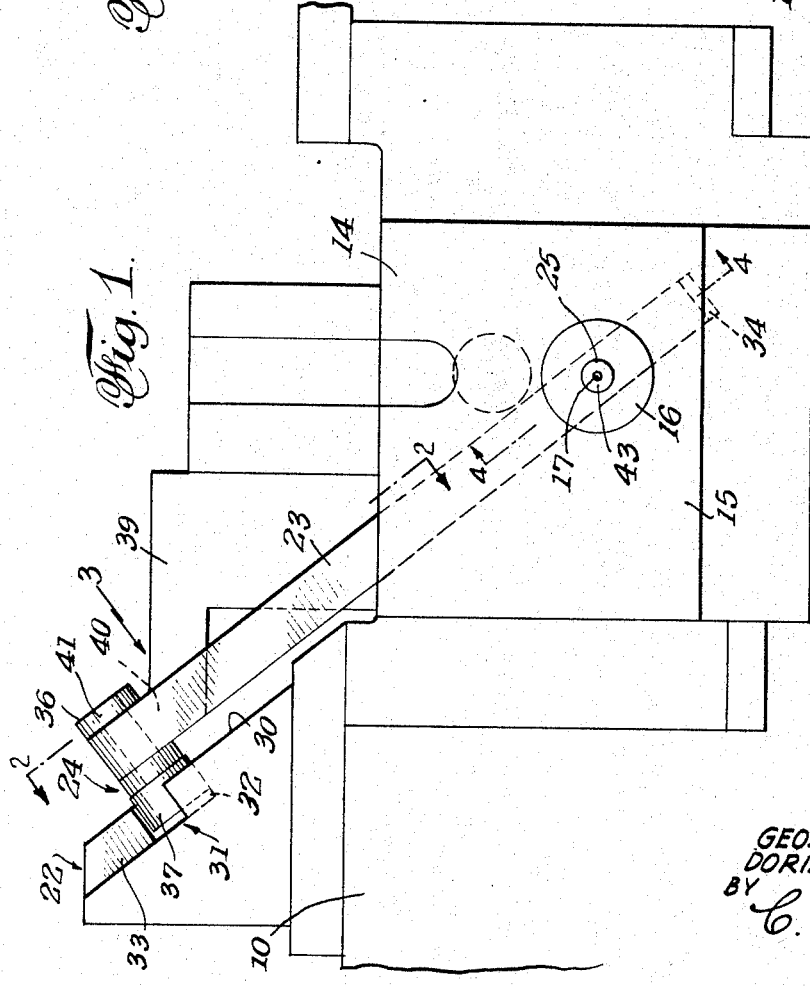
INVENTORS
GEORGE SIEBOL
DORIAN E. RIPPY
BY
C. G. Stratton
ATTORNEY

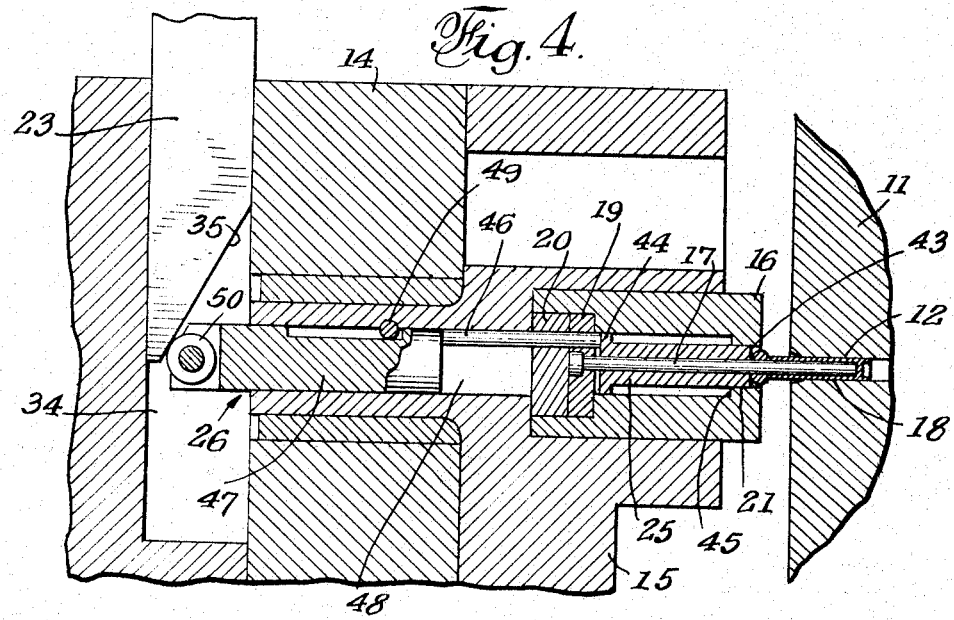
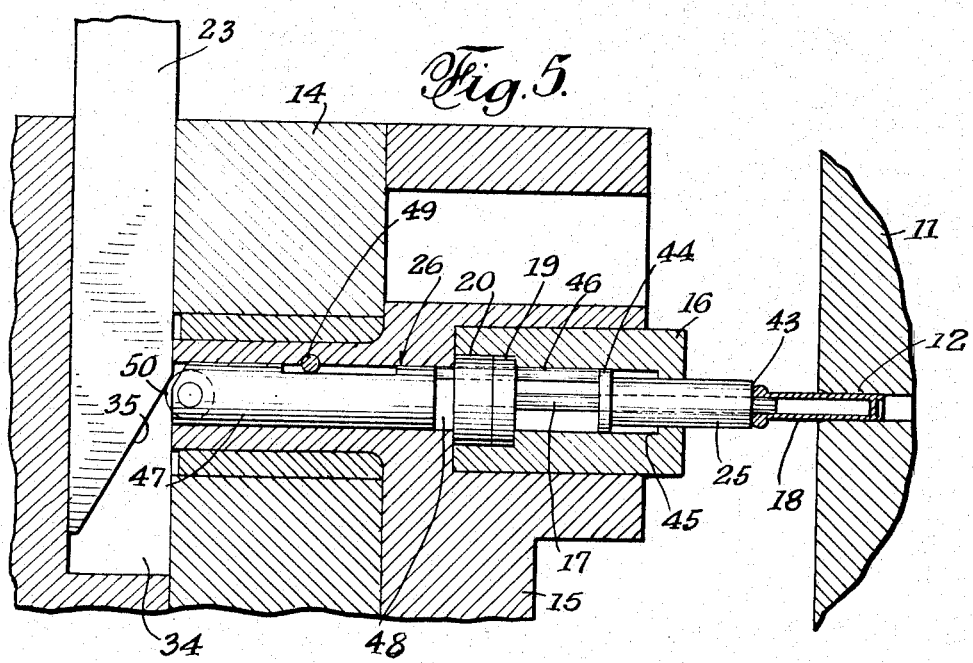

3,333,454
STRIPPER MECHANISM
George Siebol, Orange, and Dorian E. Rippy, Garden Grove, Calif., assignors to Olympic Screw & Rivet Corporation, Downey, Calif., a corporation of California
Filed Dec. 23, 1964, Ser. No. 420,717
8 Claims. (Cl. 72—335)

This invention relates to stripper mechanism and has for an object to provide means for removing an upset or extrusion member from the part forged thereby to enable retraction of a hammer block or the like while leaving the formed part in the die.

In two-die, four-blow transfer headers, or in other machines in which two or more forging or upset operations are performed on the same workpiece while the same retains its position in the die, the workpiece, after a preliminary blow or operation, may inadvertently be pulled out of the die by the upset tool. In such case, the workpiece cannot be properly completed. At best, the same will drop off the tool, and under less desirable conditions, the same may hang up on the tool and be rammed against or into the next workpiece. This may cause expensive damage to the tool and die, and even to the machine itself.

Another object of the invention is to provide stripper mechanism for insuring retraction of an upset or extrusion tool after one blow in any machine where it is desired to leave a partly-formed or pre-formed workpiece in a die for operation thereon by a succeeding blow.

This invention also has for its objects to provide such means that are positive in operation, convenient in use, easily installed in a working position and easily disconnected therefrom, economical of manufacture, relatively simple, and of general superiority and serviceability.

The above objects are realized in a structure in which a hammer block on a moving gate is movable toward and from a stationary die to forge a workpiece in said die, providing said hammer block with stripper means that moves counter to the block during retractive movement of the latter relative to the die to strip the workpiece from the forging tool of the hammer block, and providing cam-operated means that controls said stripper means during operative movement of the gate and the hammer block.

The invention also comprises novel details of construction and novel combinations and arrangements of parts, which will more fully appear in the course of the following description and which is based on the accompanying drawings. However, said drawings merely show, and the following description merely describes, one embodiment of the present invention, which is given by way of illustration or example only.

In the drawings, like reference characters designate similar parts in the several views.

FIG. 1 is a partly broken side view of a two-die, four-blow transfer header provided with stripper mechanism according to the present invention.

FIG. 2 is a view showing the gate of said header, partly in section, and as taken on the line 2—2 of FIG. 1.

FIG. 3 is a view of said mechanism as seen in the direction of the arrow 3 of FIG. 1 and in another position.

FIG. 4 is an enlarged cross-sectional view through the hammer block in the gate of said header, with the same at the finish of the forging operation on a workpiece, the view being taken on the line 4—4 of FIG. 1, and on the plane of line 4—4 of FIG. 1.

FIG. 5 is a similar view taken on the same sectional line, showing the gate moved retractively relative to the die in which the workpiece has been forged, and the stripper mechanism in the process of stripping said workpiece from the forging tool of said hammer block.

The header that is shown conventionally comprises a machine frame 10 which mounts a die block 11 which has more than one cavity, of which the die cavity 12 is shown in FIGS. 4 and 5. A gate 14, ordinarily horizontally reciprocable, is mounted in said frame 10. A machine of this character is disclosed in the patent to Purtell, No. 2,093,646, dated Sept. 21, 1937.

The present disclosure shows a hammer block 15 carried by the gate 14, the same being provided with a stripper case 16 and an upset or extrusion pin 17 that operates on a workpiece 18, initially in the form of a slug or partly-formed workpiece, in the die cavity to extrude or forge said slug into an item such as illustrated in FIGS. 4 and 5. FIG. 4 shows the extrusion pin 17 in the forged workpiece and also indicates that the latter has been partly withdrawn from the die cavity due to seizure on said pin.

It will be noted that said stripper case 16 and the extrusion pin 17, together with the pin holder 19 and the backup plate 20, are fixedly positioned in the hammer block 15, the stripper case having a longitudinal bore 21 that is open toward the die block 11.

The present stripper mechanism comprises, generally, a cam block 22 fixedly mounted on the machine frame 10, a wedge bar 23 connected by linkage 24 to the block 22, said bar being guided in and movable with the gate 14, a stripper 25 in the bore 21, and knockout means 26 interengaging the wedge bar 23 and the stripper 25 to project the latter to strip a workpiece 18 off the extrusion pin 17 during retractive movement of the gate following a forming operation.

The cam block 22 is provided with a sloping face 30 that is on the side of said block that is toward the gate 14. A cam groove 31 is formed in said face, the same comprising a horizontal or rest portion 32 and a sloping or camming portion 33 extending from the rest portion.

The wedge bar 23 is guided in a channel 34 that is formed in the gate 14 at the same angle as the angle of face 30 and offset forward from said face so that the bar 23 extends in spaced and parallel relation to the cam block face 30. As can be seen in FIG. 1, the axis of stripper case 16 and the punch parts related thereto intersects the bar 23. The lower end of said bar is formed with a cam or wedge face 35 that is in the side of the bar toward the stripper case.

The linkage 24 is shown as a link 36 and a cam roller or follower 37 extending from said link, intermediate its ends, into the cam groove 31. One end 38 of said link 36 is forked and connected to a bracket 39 secured to the gate, and is provided with an extension 40 with which said forked link end is pivotally connected. The other end 41 is also forked and pivotally connected to the end 42 of the bar 23, said bar end 41 being provided with a slot 42 that allows for arcuate movement of the link while the bar has only straight-line movement due to its guide groove 34.

The stripper 25 comprises a tubular member with a through axial passage for the extrusion pin 17, the same having an end face 43 directed toward a workpiece 18 in the die 12. A flange 44 on the inward end of the stripper 25, by engagement with a shoulder 45 in the stripper case 16, limits the outward protrusion of the stripper.

The knockout means 26 is shown as a pin or pins 46 eccentric with respect to the axis of the punch or of the extrusion pin 17, and extending longitudinally through the pin holder 19 and its backup plate 20, a knockout rod 47 in a bore 48 concentric with the stripper case 16 and opening on the rearward end of the hammer block 15, a key 49 to retain said rod against rotational movement, and a follower roller 50 on the rearward end of the knockout rod. The pin or pins 46 may be affixed to the forward end of the rod 47 or may abut said rod end.

Operation

With the gate 14 in the position thereof at the time the stripper case 16 and pin 17 have formed a workpiece 18 in the die cavity, said gate is at its rightmost position, i.e., the stripper case 16, extrusion pin 17 and stripper 25 are in forging position (see FIG. 4), and the cam and linkage mechanism are in the position of FIG. 3 with the bar 23 retracted as in FIG. 4.

Upon movement of the gate 14 according to the arrow 51 of FIG. 3, i.e., to the left, as in FIG. 5, the cam roller 37 will be moved out of the sloping cam portion 33 and will enter the rest portion 32. This will cause the link 36 to assume a horizontal position, from the upwardly angled position of FIG. 3, thereby projecting the bar 23 toward the lower end of its guide channel 34. The wedge face 35 of said bar will, therefore, cause projection of the rod 47 and the pins 46, to cause the stripper 25 to project, as shown in FIG. 5, from the stripper case 16. Since said projection slides the stripper 25 along the extrusion pin, should the workpiece 18 be seized on said pin, the same will be dislodged toward the die cavity to remain in position to be acted on by a second die carried by the gate 14.

Said stripper may remain projected over the end of pin 17 after the hammer block 15 has been fully moved away from the die block 11. Upon the next forging movement of the gate toward the block 11 (after the workpiece has been removed from the die cavity and replaced by a slug or partly-formed workpiece to be forged), the stripper 25 will be retracted, as the slug is being forged by the pin 17. This retractive movement of the stripper 25 takes place because the bar 23, during this movement of the gate, is retracted by the cam portion 33 of the cam block 22.

It would be a mere reversal of the described means to retract bar 23 instead of projecting it, by using cam means 22 that has a downwardly sloping cam portion instead of the upwardly sloping cam portion 33, and providing a wedge face on the end of the bar 23 that causes projection of rod 47 during such retraction of the bar.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. In a machine having a fixed die and a hammer block mounted on a gate that is spaced from and movable toward and from the die and provided with portions including a stripper case and an extrusion pin both fixedly carried by the case, the pin having a forging end extending beyond the forward end of said case to forge a metal member disposed in the die so that metal of said member extends from the die and forms around said pin during forging,
   (a) a stripper element slidably mounted in said stripper case adjacent the extrusion pin with an end directed toward the die and the extended end of the metal member therein,
   (b) means carried by the hammer block to project said element to cause said end thereof to engage against the end of the portion of the forged member that is around the pin and extends toward the stripper case, and
   (c) means engaged with the element-projecting means to operate the latter during retractive movement of the hammer block away from the die.

2. In a machine according to claim 1, the stripper element comprising a cylindrical member through which the extrusion pin extends.

3. In a machine according to claim 1, the means carried by the hammer block being mounted coaxially with the stripper case and the stripper element and provided with axially offset pin means to engage the end of the stripper element that is opposite to the end that is directed toward the die.

4. In a machine according to claim 1, the last-mentioned means comprising:
   (a) a bar mounted to move with the hammer block toward and from the die,
   (b) a wedge face on said bar engaged with the mentioned means carried by the hammer block on the end thereof away from the die, and
   (c) cam means to project said bar to cause stripping projection of the stripper element during movement of the hammer block away from the die.

5. In a machine according to claim 1, the last-mentioned means comprising:
   (a) a bar mounted to move with the hammer block toward and from the die,
   (b) a wedge face on said bar engaged with the mentioned means carried by the hammer block on the end thereof away from the die,
   (c) cam means to project said bar to cause stripping projection of the stripper element during movement of the hammer block away from the die,
   (d) fixedly mounted cams comprising part of the cam means, and
   (e) linkage connected to said bar and engaged with said cams to move the bar in a direction to cause the wedge face thereof to project the stripping element during movement of the hammer block away from the die.

6. In a machine having a fixed die and a hammer block mounted on a gate that is spaced from and movable toward and from the die and provided with portions including a stripper case and an extrusion pin both fixedly carried by the case, the pin having a forging end extending beyond the forward end of said case to forge a metal member disposed in the die so that metal of said member forms around said pin during forging,
   (a) a stripper element slidably mounted in said stripper case adjacent the extrusion pin with an end directed toward the die,
   (b) a coaxial knockout rod provided with axially offset pin means to engage the end of the stripper element that is opposite to the end directed toward the die,
   (c) a bar mounted to move with the hammer block toward and from the die and provided with a wedge portion engaged with the end of the knockout rod away from the die, and
   (d) fixed cam means to move said bar transversely to its movement relative to the die to engage said wedge portion of the bar with the knockout rod to project the latter and the stripper element to strip the forged member from the extrusion pin during retractive movement of the hammer block away from the die.

7. In a machine according to claim 6, a link having one end in lost-motion connection with the bar and an opposite end pivotally connected to the hammer block, and a cam roller on an intermediate part of the link and engaged with said cam means.

8. In a machine according to claim 1, provided with a gate mounting the hammer block and movable therewith, the last-mentioned means comprising:
   (a) a bar mounted in said gate to move transversely to the movement of the gate and provided with a wedge face to engage and project the element-projecting means during movement of the gate away from the die,
   (b) a link pivotally carried by one end by the gate, having its opposite end in lost-motion connection with the bar, and provided with a cam follower intermediate said ends, and
   (c) a fixed cam means engaged by said cam follower to cause the bar to move in stripper element-projecting direction during said retractive movement of the gate.

References Cited

UNITED STATES PATENTS

| | | | |
|---|---|---|---|
| 1,849,669 | 3/1932 | Glassner | 72—334 |
| 2,652,620 | 9/1953 | Sutowski | 72—335 |
| 2,845,638 | 8/1958 | Sciullo | 78—104 |
| 3,146,749 | 9/1964 | Heinle | 72—335 |
| 3,186,209 | 6/1965 | Friedman | 72—334 |

HARRISON L. HINSON, *Primary Examiner.*